US009809335B2

(12) United States Patent
Jansen

(10) Patent No.: US 9,809,335 B2
(45) Date of Patent: Nov. 7, 2017

(54) METHOD FOR BAG CLOSURE AND SEALING

(71) Applicant: Coating Excellence International LLC, Wrightstown, WI (US)

(72) Inventor: Mark E. Jansen, Appleton, WI (US)

(73) Assignee: Coating Excellence International LLC, Wrightstown, WI (US)

( * ) Notice: Subject to any disclaimer, the term of this patent is extended or adjusted under 35 U.S.C. 154(b) by 512 days.

(21) Appl. No.: 14/505,160

(22) Filed: Oct. 2, 2014

(65) Prior Publication Data

US 2015/0033676 A1 Feb. 5, 2015

Related U.S. Application Data

(62) Division of application No. 13/569,211, filed on Aug. 8, 2012, now Pat. No. 8,850,778, which is a division of application No. 12/535,185, filed on Aug. 4, 2009, now Pat. No. 8,241,193.

(51) Int. Cl.
*B65B 7/08* (2006.01)
*B65B 51/20* (2006.01)
*B29C 65/10* (2006.01)

(52) U.S. Cl.
CPC ............ *B65B 7/08* (2013.01); *B29C 65/103* (2013.01); *B65B 51/20* (2013.01)

(58) Field of Classification Search
CPC .. B65B 7/06; B65B 7/08; B65B 51/20; B29C 65/103; B29C 65/12
USPC .......... 53/479, 370.9, 373.9, 387.3; 493/191, 493/192
See application file for complete search history.

(56) References Cited

U.S. PATENT DOCUMENTS

| | | | | | |
|---|---|---|---|---|---|
| 2,783,693 A | * | 3/1957 | Felber | ....................... | B31B 1/00 156/497 |
| 3,381,448 A | * | 5/1968 | Ayres et al. | ............ | B65B 51/20 118/58 |
| 3,462,916 A | * | 8/1969 | Chin | ....................... | B65B 51/20 324/76.83 |
| 3,562,920 A | * | 2/1971 | Vuilleumier et al. | .. | B65B 51/20 156/497 |
| 3,610,114 A | * | 10/1971 | Kaminsky | ............... | B65B 51/20 493/134 |
| 3,751,876 A | * | 8/1973 | Oakley et al. | .......... | B65B 51/20 156/282 |

(Continued)

FOREIGN PATENT DOCUMENTS

GB    1309941 A  *  3/1973  ........... B29C 65/103

*Primary Examiner* — Stephen F Gerrity
(74) *Attorney, Agent, or Firm* — Duane Morris LLP

(57) ABSTRACT

A method and apparatus for sealing a bag made of a polymeric material by applying heat activated layers on different portions of the bag, wherein the first adhesive layer and the second adhesive layer have respective heat activation temperatures below the softening point temperature of the polymeric material; after creasing the bag along a fold line, applying heat at a temperature below the softening point temperature of the polymeric material to activate the first adhesive layer and the second adhesive layer to adhesive states after the bag has been filled with contents; and folding the bag to form an adhesive-to adhesive seal by contact between the heat activated first adhesive layer and the heat activated second adhesive layer.

9 Claims, 11 Drawing Sheets

(56) References Cited

U.S. PATENT DOCUMENTS

| | | | | | |
|---|---|---|---|---|---|
| 3,777,448 | A | * | 12/1973 | Howe | B65B 51/20 |
| | | | | | 53/376.7 |
| 3,855,037 | A | * | 12/1974 | Imhagen et al. | B65B 51/20 |
| | | | | | 156/211 |
| 4,080,237 | A | * | 3/1978 | Deimel | B65B 51/20 |
| | | | | | 156/226 |
| 4,088,264 | A | * | 5/1978 | Vogt | B65D 75/26 |
| | | | | | 383/111 |
| 4,894,104 | A | * | 1/1990 | Hemus | B65B 51/023 |
| | | | | | 156/152 |

* cited by examiner

METHOD FOR BAG CLOSURE AND SEALING

CROSS REFERENCE TO RELATED APPLICATIONS

This application is a division of U.S. application Ser. No. 13/569,211, filed Aug. 8, 2012, now U.S. Pat No. 8,850,778, which is a division of U.S. Ser. No. 12/535,185, filed Aug. 4, 2009, now U.S. Pat. No. 8,241,193.

FIELD OF THE INVENTION

The invention relates to polymeric bags, and to a method and apparatus for closure and sealing of polymeric bags, wherein the bag is sealable by a heat activated adhesive.

BACKGROUND

U.S. Pat. No. 3,380,646 discloses a container of thermally weldable, plastic material and a method of producing the container by welding together multiple strips or sheets of plastic material to form a container having a welded closed, bottom part of the container. An open top of the container is collapsed and flattened to provide a pinch closed top.

U.S. Pat. No. 5,048,692 discloses a bag folded one or more times to form a primary closure. A flap seal extends across the folded configuration. A string underneath the flap seal is used to tear open the flap seal and permit the bag to unfold. A zipper closure provides a secondary enclosure.

US 2007/0292053 A1 discloses a bag of paper material and a paper tape coated with a hot melt adhesive, wherein the tape is folded to adhere the hot melt adhesive against a front panel of the paper bag to provide a glued paper-to-paper section. The tape substitutes for a stepped end of a multi-wall paper bag. The stepped end provides a sealing flap coated with hot melt adhesive, wherein the sealing flap can be folded over and sealed to the front panel of the paper bag.

The hot melt adhesive is reactivated by a stream of hot air coming from a hot air sealer equipment. The equipment is designed to blow hot air only on the 1.5 inch width of pre-applied adhesive to render the adhesive to a heat activated adhesive state. Typical heat settings on a hot air sealer equipment for multi-wall paper bags often exceed 204.44° C. (400° F.). However, woven polypropylene bags will deform at approximately 148.89° C. (300° F.). A need exists to modify the equipment to seal woven polymeric bags at a reduced heat activation temperature. During the development of a pinch bottom closure for woven polymeric bags, it became clear that hot air sealer equipment that typically seal multi-wall paper bags needed to be modified

SUMMARY OF THE INVENTION

A bag of polymeric material has a first panel and a second panel forming a pinch closed bag end therebetween, a first layer of heat activated adhesive material on a portion of the first panel having a heat activated first adhesive layer to form an adhesive-to adhesive seal with a heat activated second adhesive layer on a portion of the second panel, the first adhesive layer and the second adhesive layer having respective melt temperatures below the softening point temperature of the polymeric material.

An embodiment of a bag is foldable on itself to form a folded first panel and to form an adhesive-to-adhesive seal of the first adhesive layer on the folded first panel.

An embodiment of a bag has the second adhesive layer on the foldable sealing flap portion.

An embodiment of a bag has a second panel longer than a first panel wherein the second layer of heat activated adhesive material is on a portion of the second panel that is longer than the first panel.

A method of making a bag includes, forming a pinch closed bag end between a first panel and a second panel, applying a heat activated first adhesive layer on a portion of the first panel, applying a heat activated second adhesive layer on a portion of the second panel, wherein heat activation temperatures of the first adhesive layer and the second adhesive layer are below the softening point temperature of the polymeric material, and after filling the bag with contents activating the first adhesive layer and the second adhesive layer by applying heat at a temperature below the softening point temperature of the polymeric material, and pinch closing the end of the bag to urge the adhesive layers into contact and to form an adhesive-to-adhesive seal.

An embodiment of the method includes, folding the bag to fold the first panel on itself to urge the second adhesive layer into contact with the first adhesive layer on the first panel of the bag and form an adhesive-to-adhesive seal.

Another embodiment of the method includes, folding a flap portion of the second panel over the first panel to urge the second adhesive layer into contact with the first adhesive layer on the first panel of the bag and form an adhesive-to-adhesive seal.

BRIEF DESCRIPTION OF THE DRAWINGS

Embodiments of the invention will now be described by way of example with reference to the accompanying drawings.

DETAILED DESCRIPTION

Figure 1:
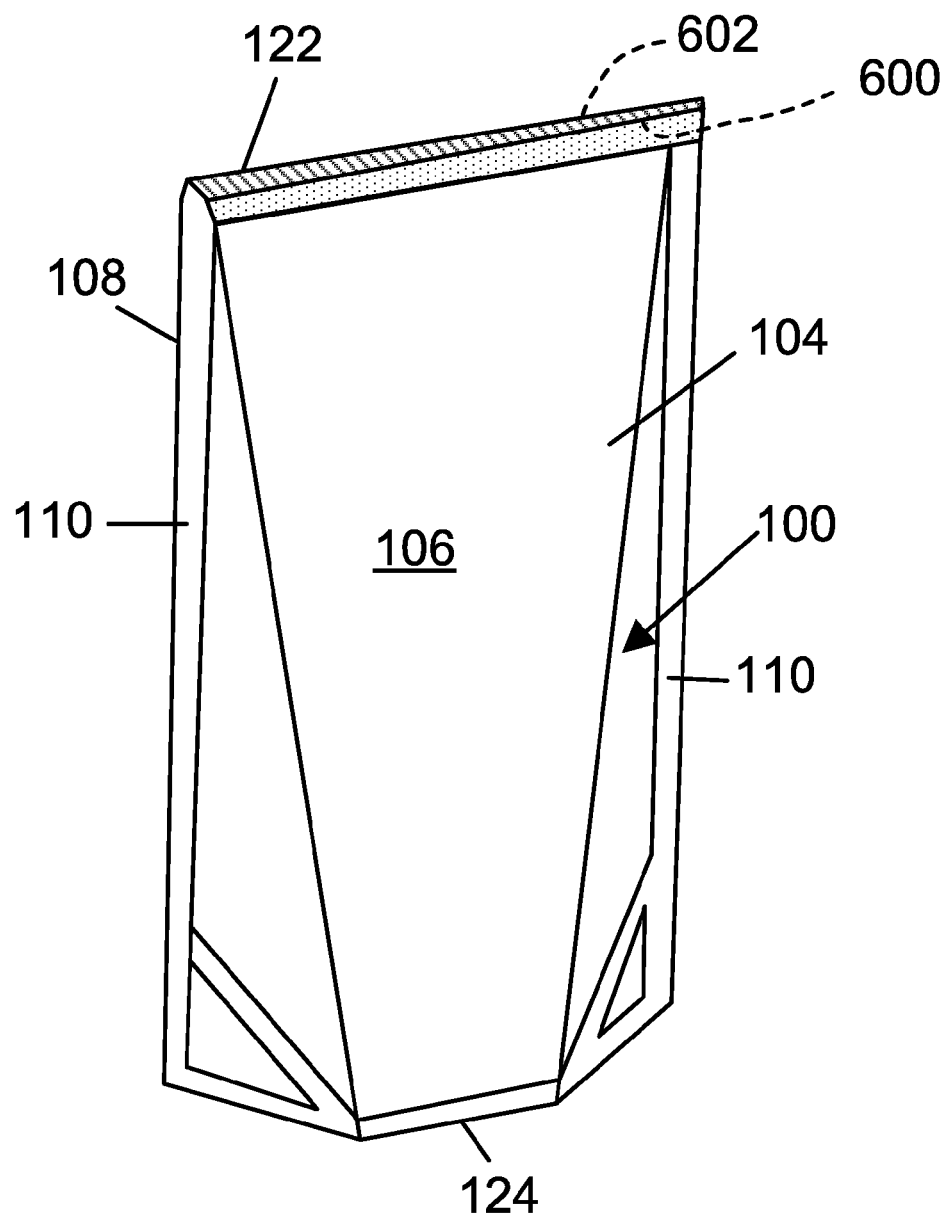
FIG. 1 is an isometric view of an embodiment of a bag having a pinch closed end.

Bags to be used for bulk packaging of granular or finely ground materials, such as nutrients including, but not limited to, whole and ground grains, seeds, dry pet food, chemical fertilizers, other bulk food and non-food products, and growing plant treatments must be durable to resist material degradation, abrasion, puncture, contamination and leakage of contents, and must withstand a drop test while sealed and filled with contents weighing up to about 50 pounds, and even up to about 80 pounds. Moreover, such bags are typically disposed of after use, which requires an inexpensive and light-weight construction that is environmentally friendly, may be recyclable, and reduces waste in the supply chain from production, use of the bag, to disposal in either a recycling stream or landfill. Currently, multi-walled paper and polymer layer bags, consisting of multiple paper layers and layers of polymer film, are heavy, expensive to produce and ship, easy to tear and puncture, and create waste in the supply chain. Multi-wall paper/polymer layer bags, traditionally used to package bulk products, are not recyclable and add significant amounts of materials to landfills. This invention overcomes many of the significant drawbacks of multi-wall paper/polymer layer bags, by offering a lighter weight bag that is less expensive, more durable and tear-resistant, resulting in significantly reduced waste in the supply chain, and is 100% recyclable in a suitable recycling stream. Moreover, this invention can function essentially in the same way on existing bag filling and sealing equipment to perfect a pinch-sealed bag filled with product.

A typical manufacturing production line provides apparatus to fill the bags with contents, and further provides apparatus to close the bag in a simple manner by pinch closing, and further provides equipment to seal the pinch closed bag. Bags of traditional construction can be close by sewing or alternatively, sealed with a hot melt sealant instead of sewing. Such bags of traditional construction include multi-wall bags fabricated of paper and polymeric film laminates. The bag construction must allow quick filling of the bag with contents and thereafter must allow closing and sealing the bag.

The traditional bag construction has layers of polymer laminated with a paper layer or layers. Sealing of the traditional bags after filling is accomplished by re-melting a hot melt adhesive and/or meltable polymer layer at an elevated temperature while the paper resists damage to the bag construction. The high flash point inherent to paper is relied upon to withstand the application of heat at an elevated temperature and thereby to protect the bag from damage due to the heat and temperature. Further, a thin polyethylene, PE, polymer coating on the paper surface can melt or soften together with the hot melt adhesive to adhere to the paper and form a secure seal. Existing end-user production line equipment applies hot air onto the bag to melt and activate the hot melt adhesive and/or meltable polymer layer, following the bag filling operation. The heat must be applied at a temperature that melts the hot melt adhesive, and further, to at least partially melt the polymer coating on the paper surface, while relying on the paper to withstand the heat and temperature, and to prevent bag weakening or burning due the heat and temperature. However, a major drawback of the multi-wall paper and polymer laminates is that they are composite materials not capable of recycling as either paper or plastic as a single material classification. Further, the multi-wall laminates of the traditional bag are not compostable, and consequently remain in one piece in landfills. Further, the multi-wall laminates are heavy, and add unnecessary shipping costs.

In an end-user's manufacturing production line, apparatus is provided to fill the bags with contents through an open end of the bag, followed by closing and sealing the filled bag. Traditional production lines have employed stitching equipment to sew the bags shut. Alternative production lines have heated air jets to apply heat at an elevated temperature to melt and activate pre-applied hot melt adhesives that have been pre-applied to traditional bags of thick multiwall paper and polymer film laminate construction. Thereafter, a closure mechanism closes the bags in an advantageous manner simply by pinch closing the open ends. The closure mechanism applies pressure on the bags to close and hold the bags closed while the hot melt adhesive adheres to the closed bag and until the adhesive cools and hardens.

The heat must be applied at a temperature that melts the hot melt adhesive, and further, which can melt portions of the polymer coating on the paper surface, while relying on the paper to withstand the heat and temperature, and prevent weakening or burning due the heat and temperature. The traditional bags have a construction of thick multi-wall paper and polymer film laminates. The one or more, thick paper layers of the traditional bags withstand the heat applied at elevated temperatures without weakening the bag strength and without burning the paper. Further, a laminated film coating of polyethylene, PE, on the paper surface partially melts while in contact with the melted, hot melt adhesive to form a heat seal with the adhesive.

The embodiments of the invention provide a sustainable solution to the long existing need for bags that replace traditional bags of multi-wall paper and polymer laminates, and yet can withstand the application of heat and temperature to seal the bags, which continue to be prevalent in existing production equipment.

Accordingly, there has been a long existing need for a bag fabricated of structural components capable of being recycled or resulting in less landfill material compared to traditional bags, and capable of being sealed by existing production equipment to avoid expensive replacement of existing production line equipment. Accordingly, to replace the existing structural components of a laminated paper and polymer bag with an improved bag, the improved bag must be heat sealed by existing production equipment while withstanding the application of heat and/or pressure to melt the adhesive and seal the bag. Moreover, there has been a long existing need to eliminate a paper and polymer laminate as one of the structural components of the bag, which is incapable of recycling and/or degradation in a land fill, and which add significantly higher weight and quantities of materials in a landfill.

Traditional multi-wall paper and polymer laminate bags each have about 275 grams of paper and 50 grams of polypropylene polymer, and a carbon footprint of about 11 as a measure of carbon emissions. Lighter weight bags of about 150 grams results from embodiments of the invention with fewer raw materials than those used in making the traditional bags, and result in a substantially reduced carbon footprint of about 5.

According to embodiments of the invention, woven bags are fabricated entirely of a recyclable polypropylene, and with structural components including a tubular woven (mesh) bag laminated inside of a non-porous polymeric film of a single layer or of laminated layers. The bags are fabricated entirely of a recyclable polypropylene material that is recyclable and may be compostable due to having resin additives such as metallocene, and further that is free of recycled or contaminated polymers of unknown chemistry and unknown material mixtures. Moreover, the bags according to embodiments of the invention are less heavy and are more resistant to abrasion, tearing and puncture, and are reusable compared with traditional multi-wall paper and polymer laminates that are susceptible to abrasion and damage. The bags according to embodiments of the invention reduce waste due to shipping costs, damaged bag contents and increased shelf life of the contents.

The embodiments of the invention fulfill a long existing need for lighter weight, strong bags having structural components that eliminate traditional non-recyclable paper-polymer laminates, and moreover, that are durable for reuse, and are degradable by composting in a landfill and are recyclable as a single material. Moreover, the recyclable and/or compostable bags include water soluble adhesive materials as structural components of the bags. Embodiments of the adhesive materials can be pre-applied while soluble in water, a nontoxic solvent. The adhesive materials are applied onto opposed surfaces of the bags, followed by curing by exposure to radiant or entrained heat, electron beam, EB, radiation, air or other curing medium and/or to evaporate the nontoxic dispersion for environmentally safe removal from the activatable adhesive components of the dispersion mixture that attain a non-adhesive hardened state, which is non-reactive to water or humidity, and is nontoxic by incidental contact with nutrients being filled in the bags. An opposite end of each of the bags has a pinch bottom or alternatively, a flat bottom configuration that is closed and sealed by sewing, or by an adhesive preferably a nontoxic adhesive or by plastic welding or by a material including, but not limited to polymeric, paper or nonwoven tape. The bags are folded flat for shipment to another manufacturing facility where the bags are filled with contents and closed and sealed.

The adhesive materials to seal the bag are activatable to a melted adhesive state using existing production line equipment that apply heat at a temperature sufficiently below the softening point temperature Tg of the polymeric structural components of the bag, and to melt the adhesive materials to an adhesive state without damaging the other structural components of the bag.

While a traditional multi-wall paper/polymer layer bag can be sealed with a re-melted hot melt adhesive, these hot melt adhesives are not suitable for sealing polymeric bags, which typically are comprised of one or more polymeric layers of recyclable polypropylene, or a recyclable and/or compostable polypropylene woven bag and an outer polymeric layer or laminate of two or more polymeric layers of recyclable polypropylene or other polymer material, but not including either paper or an outer layer, which is not heat-sealable on traditional bag manufacturing production equipment. The heat required to activate a hot melt adhesive to an adhesive state would be detrimental to a polymer woven bag and would destroy the structural integrity of the bag. A traditional multi-wall paper/polymer layer bag can be sealed with a hot melt adhesive, whereas on a polymeric bag the heat applied by existing end-user equipment to reactivate or re-melt a hot melt adhesive would further heat the polymer material of the bag above its softening point $T_g$ temperature causing the polymer material to soften, lose tensile strength or even undergo plastic deformation. Accordingly, typical known hot melt adhesives are not suitable for forming a seal on a polymeric bag.

Figure 1A:
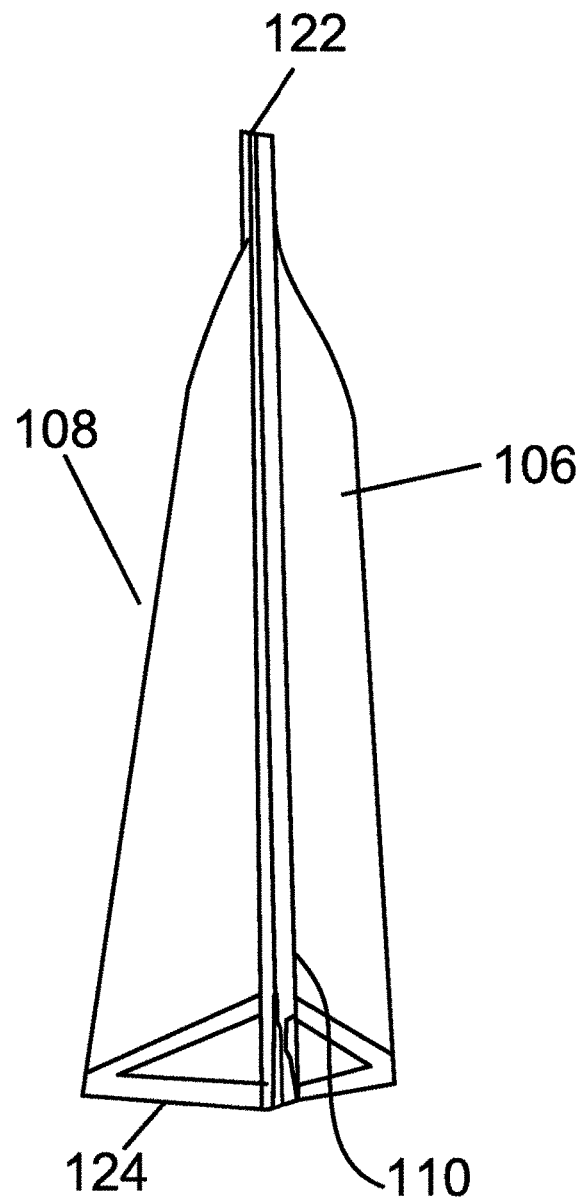
FIG. 1A is a side view of the bag in FIG. 1.

FIGS. 1 and 1A disclose an embodiment of a polymeric woven bag 100, including an outer layer 104 having a single polymeric film or a laminate of multiple polymeric films, and a polymeric woven bag provides an inner layer 102 (FIG. 3) laminated to or adhesively adhered to the outer layer 104. The outer layer 104 of the bag includes either a single polymeric film or a laminate of multiple polymeric films. For example, a laminate of the outer layer 104 includes a transparent film, a second film and printed graphics on either the transparent film or the second film, wherein the printed graphics are protected between the transparent film and the second film. The woven bag 100 has a first panel 106 and a second panel 108 configured either as a continuous tube or as separate pieces joined together to form a bag.

The first panel 106 and the second panel 108 are joined along their side edges along sides 110 of the bag 100. An end 122 of the bag is open through which contents can be introduced into the bag 100. The end 122 is adapted to be pinch closed between end edges of the first panel 106 and the second panel 108. The panels 106, 108 are joined along their side edges and end edges by plastic welding of the edges or by an adhesive. Alternatively the bag 100 is tubular, and the panels 106, 108 are defined by making folds or creases in the bag 100. An opposite end 124 of the bag 100 is closed by being sewn, taped, glued or plastic welded. Advantageously, the bag 100 is fabricated entirely of compostable polypropylene, PP.

The open end 122 is adapted for being closed and sealed after the bag 100 has been filled with contents, as will now be discussed. A structural component of the first panel 106 includes a first adhesive layer 600 on a portion of the first panel 106. A structural component of the second panel 108 includes a second or further adhesive layer 602 on a portion of the second panel 108. According to an embodiment of the invention, the adhesive layer 600 and the further adhesive layer 602 are applied simultaneously. According to another embodiment of the invention, the adhesive layer 600 and the further adhesive layer 602 can be the same material applied simultaneously or, alternatively, applied separately.

Figure 2:
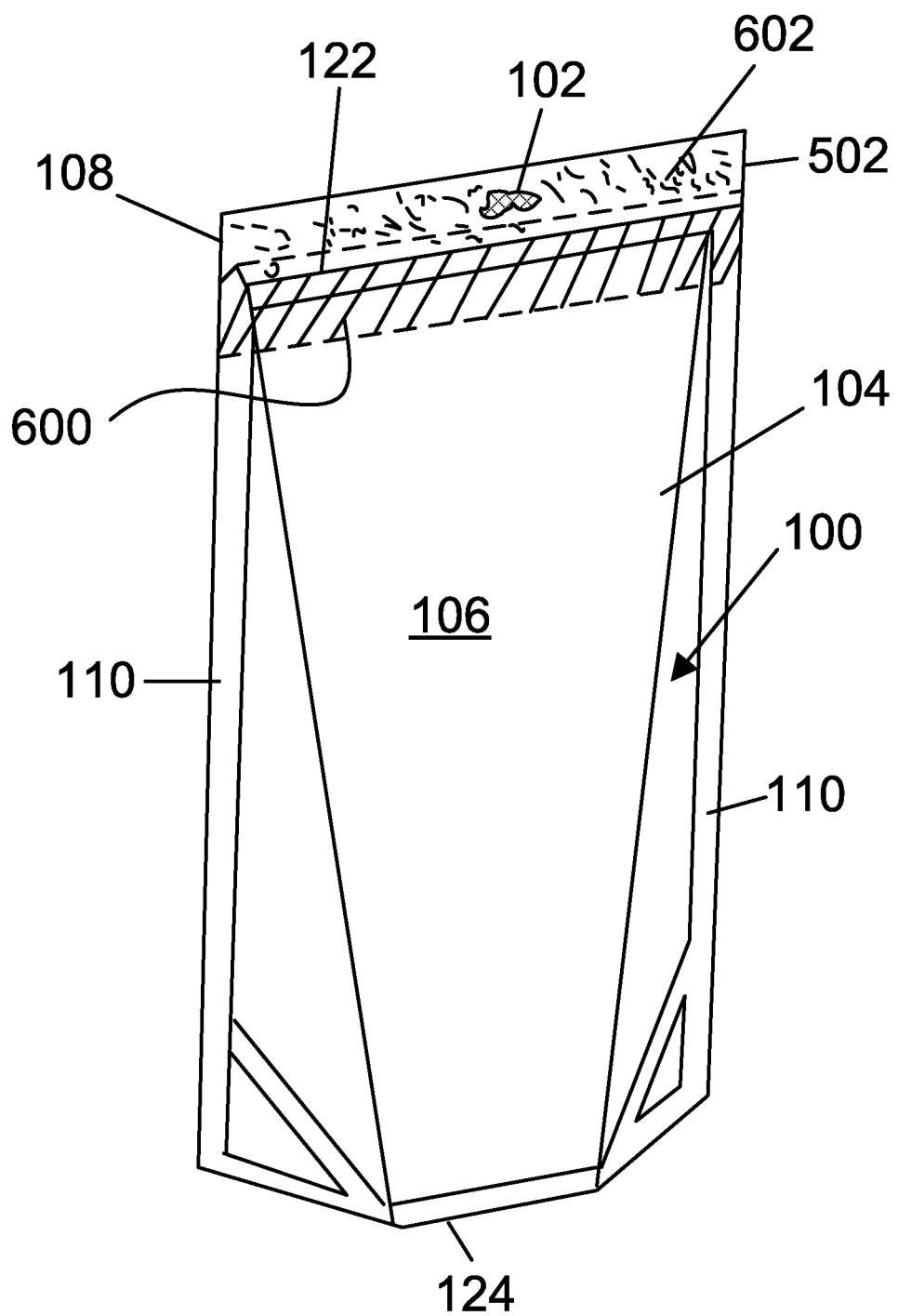
FIG. 2 is an isometric view of an embodiment of a bag having a sealing flap portion.
Figure 2A:
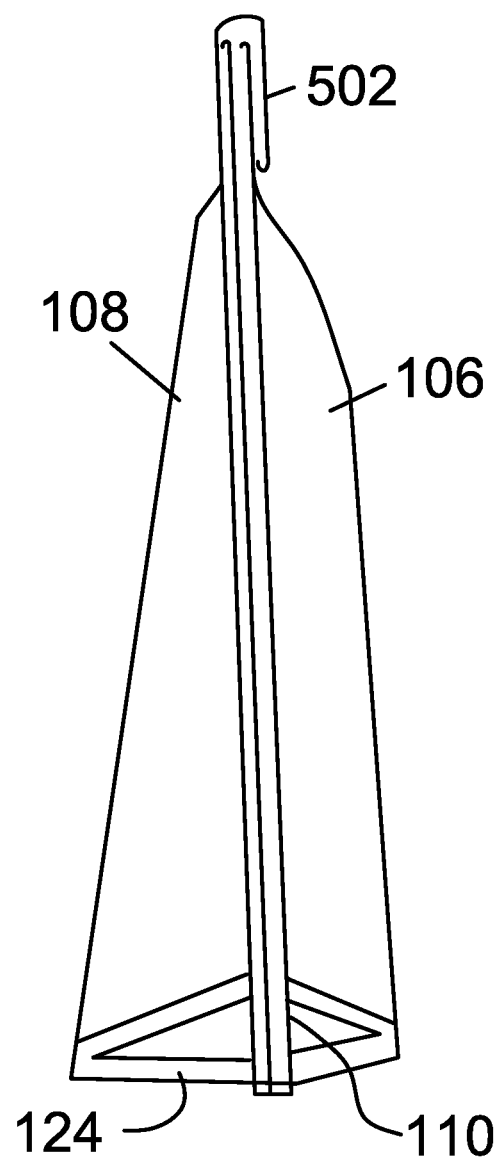
FIG. 2A is a side view of the bag of FIG. 2 with the sealing flap portion closed and sealed.

FIGS. 2 and 2A disclose another embodiment of a polymeric woven bag 100 having a similar construction as the embodiment of the bag 100 disclosed by FIGS. 1 and 1A, including the outer layer 104 having the single polymeric film or a laminate of polymeric films, the inner polymeric woven bag layer 102, the first panel 106, the second panel 108 and the open end 122 of the bag that is pinch closed by closing the first panel 106 and the second panel 108 against each other at their end edges adjacent the open end 122. A portion of the woven bag layer 102 is depicted with a woven appearance. Further, the polymeric woven bag has a stepped, or step cut construction at the open end 122, wherein a portion of the first panel 106 is removed by severing, cutting or hot knife, and wherein the first panel 106 is made shorter than a longer portion 502 of the second panel 108 at the open end. The longer portion 502 provides a foldable flap portion 502 on the second panel 108. Further, the inner woven layer 102 of the foldable flap portion 502 is exposed. The bag has a structural component including the adhesive coated, foldable flap portion 502. The structural component of a first adhesive layer 600 is on the adhesive coated, foldable flap portion 502. The bag has a further structural component of a second or further adhesive layer 602 on the adhesive coated first panel 106. The adhesive layers 600, 602 are air dried to a non-adhesive solid state to evaporate the dispersion mixture in air, by passage through a heated oven or directing fan blown heated air onto the adhesive layers 600, 602, or by passage through dry air at low relative humidity or by electron beam, EB, radiation. According to an embodiment of the invention, the adhesive layer 600 and the further adhesive layer 602 are applied simultaneously. According to another embodiment of the invention, the adhesive layer 600 and the further adhesive layer 602 can be the same material applied simultaneously or, alternatively, applied separately.

The adhesive layers 600, 602 are dried to a stable, non-adhesive state impervious to water, water vapor and ambient temperatures.

An embodiment of the method of making the bag 100 of FIGS. 2 and 2A includes, forming a bag end 122 between a first panel 106 and a second panel 108, applying the heat activated adhesive layer 600 on a portion of the panel 106, applying another heat activated adhesive layer 602 on a portion of the panel 108, wherein heat activation temperatures of the first adhesive layer 600 and the second adhesive layer 602 are below the softening point temperature of the polymeric materials of the bag 100, drying the adhesive layers 600, 602 to a stable non-adhesive state impervious to water or water vapor and ambient temperatures, wherein the end 122 of the bag 100 facilitates filling the bag 100 with contents, and thereafter the bag is closed and sealed by applying heat to activate an adhesive-to-adhesive seal between the adhesive layers 600, 602.

Figure 3:
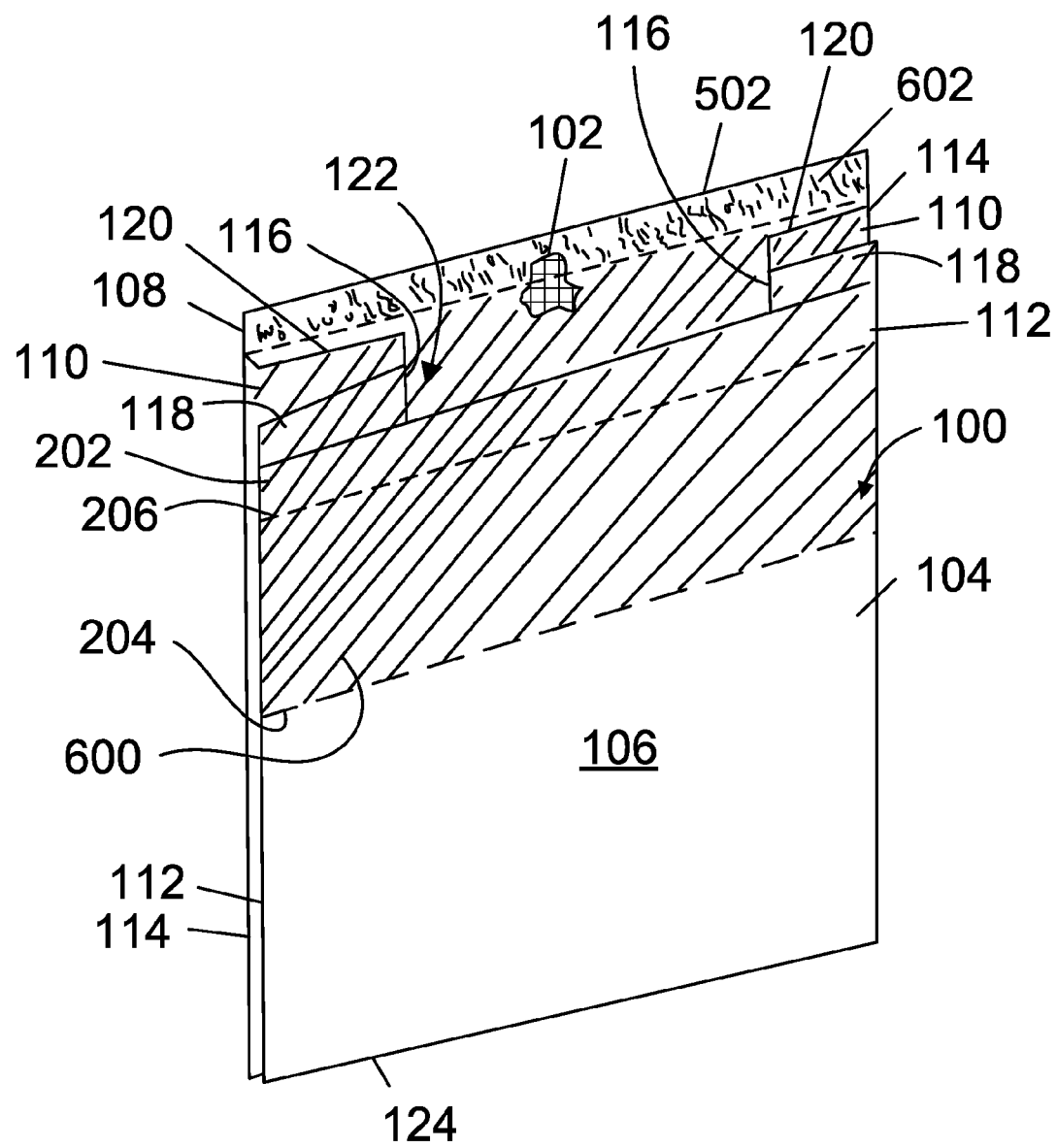
FIG. 3 is an isometric view of an embodiment of a bag having gusseted sides and a stepped configuration.
Figure 3A:
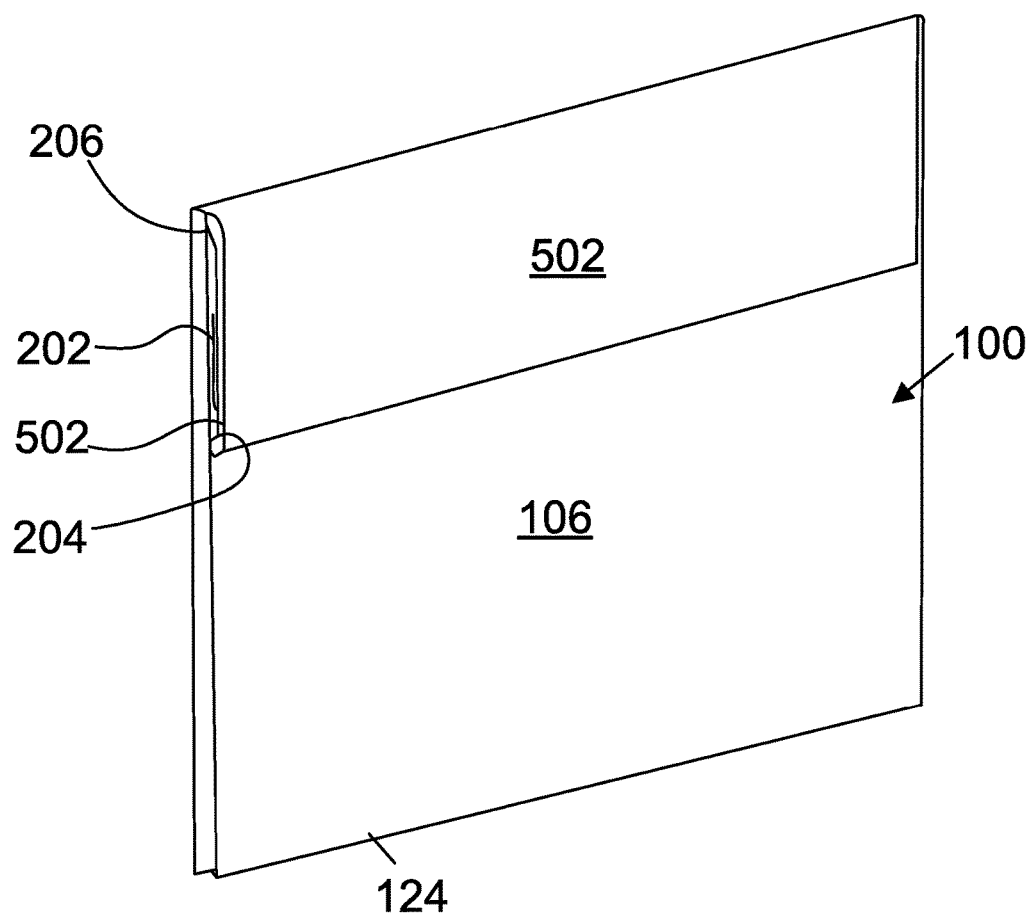
FIG. 3A is a view similar to FIG. 3 with the sealing flap portion closed and sealed.

FIGS. 3 and 3A disclose another embodiment of the bag 100 including the outer layer 104 having the single polymeric film or a laminate of polymeric films, the inner polymeric woven bag layer 102, the first panel 106, the second panel 108 and the open end 122 of the bag that is pinch closed by closing the first panel 106 and the second panel 108 against each other at their end edges adjacent the open end 122. A portion of the woven bag layer 102 is depicted with a woven appearance. The polymeric woven bag has a stepped, or step cut construction at the open end 122, wherein a portion of the first panel 106 is removed by severing, cutting or hot knife, and wherein the first panel 106 is made shorter than a longer portion 502 of the second panel 108 at the open end. The longer portion 502 provides a foldable flap portion 502 on the second panel 108. Further, the inner woven layer 102 of the foldable flap portion 502 is exposed. The first panel 106 and the second panel 108 are joined along their side edges along sides 110 of the bag 100. An end 122 of the bag is open through which contents can be introduced into the bag 100. The end 122 is adapted to be pinch closed between end edges of the first panel 106 and the second panel 108. The panels 106, 108 are joined along their side edges and end edges by plastic welding of the edges or by an adhesive. Alternatively the bag 100 is tubular, and the panels 106, 108 are defined by making folds or creases in the bag 100. An opposite end 124 of the bag 100 is closed by being sewn, taped, glued or plastic welded. Advantageously, the bag 100 is fabricated entirely of compostable polypropylene, PP.

In FIGS. 3 and 3A, a structural component of the first panel 106 includes a first adhesive layer 600 on a portion of the first panel 106. A structural component of the second panel 108 includes a second or further adhesive layer 602 on a portion of the second panel 108. The adhesive layers 600, 602 are dried to a non-adhesive stable state by passage through a heated oven or directing fan blown heated air onto the adhesive layers. According to an embodiment of the invention, the adhesive layer 600 and the adhesive layer 602 are applied simultaneously. According to another embodiment of the invention, the adhesive layer 600 and the further adhesive layer 602 can be of the same material applied simultaneously on the bag 100 or, alternatively, applied separately.

Further, in FIGS. 3 and 3A, the bag 100 has sides 110 in the form of side gussets 110. Longitudinal end folds or creases 112 join the side gussets 110 join with the first panel 106. Longitudinal end folds or creases 114 join the side gussets 110 with the second panel 108. Longitudinal folds or creases 116 are between foldable first portions 118 and foldable second portions 120 of respective side gussets 110. The stepped or step cut construction exposes the first portions 118 and the second portions 120 of respective side gussets 110.

The bag 100 is foldable along a fold line 206 extending across the bag 100, wherein the fold line 206 extends across the first panel 106 between a panel first section 202 adjacent to a panel second section 204. The bag 100 is foldable without creasing, or alternatively is foldable along a crease formed along the fold line 206 by a creasing apparatus. The first adhesive layer 600 is applied on the first section 202 of the first panel 106, and on the second section 204 of the first panel 106, and on the exposed portions 118, 120 of the side gussets 110 exposed by the stepped or step cut construction. The adhesive layers 600, 602 are dried similarly as described above.

In FIG. 3A, the bag 100 is foldable along the fold line 206 to fold the first panel 106 on itself and to urge the adhesive layer 600 on the panel first section 202 into contact with the further adhesive layer 600 on the panel second section 204. The sealing flap portion 502 is folded onto the panel second section 204 of the panel 106 to hold the bag 100 in a folded configuration. An adhesive-to-adhesive seal is formed by applying heat to activate the adhesive layers 600, 602 (FIG. 3) to adhesive states while in contact with each other.

According to embodiments of the invention, an adhesive material was required to be developed to provide a first adhesive layer 600 of heat activated adhesive material on a portion of the bag 100. The same or another adhesive material was required to be developed to provide a second adhesive layer 602 of heat activated adhesive material on another portion of the bag 100, wherein heat activation temperatures of the first adhesive layer 600 and the second adhesive layer 602 are below the softening point temperature of the polymeric material of the bag 100, and wherein the adhesive layer 600 can be urged into contact with the further adhesive layer 602 and form an adhesive-to-adhesive seal to close and seal the bag 100 at its end 122. Sealing was advantageously to be performed by using existing end-user production line equipment for applying controlled temperature heat to activate the adhesive layers 600, 602 to adhesive states. A soluble adhesive was developed, wherein the adhesive layer 600 and the adhesive layer 602 comprise an adhesive material soluble in an air dryable solvent. For example, the adhesive layer 600 and the further adhesive layer 602 comprise adhesive material or materials soluble in water and air dried to dimensionally stable, non-adhesive states impervious to water or water vapor.

The adhesive layer 600 and the further adhesive layer 602 comprise respective adhesive materials having a melt temperature below 300° F., which is below the softening point temperature $T_g$ of the polymeric materials in the layers 102, 104 of the bag 100. Further, each of the adhesive layer 600 and the further adhesive layer 602 comprise adhesive materials dried in air, at a temperature below the temperature required to activate to adhesive states.

Then, the embodiments of the bag 100 are prepared for storage and shipment. The end 122 of the bag 100 is pinch closed by closing the first panel 106 and the second panel 108 against each other at their end edges adjacent the open end 122. The end 122 of the bag 100 is folded flat while remaining unsealed, and the bag 100 is folded flat for storage and shipment to another manufacturing facility wherein the end 122 of the bag 100 is opened, the bag 100 is unfolded and expanded from the flat configuration, and the bag is filled with contents. Then, the end 122 is closed and sealed. The adhesive layers 600, 602 are activated to an adhesive state by applying heat at a heat activation temperature below the heat activation temperatures of standard or traditional hot melt adhesives or solvent based adhesives that can seal traditional paper and polymer laminated bags without damaging the paper layers, but which exceed the softening point temperature $T_g$ of polymeric bags 100 fabricated without paper layers. The standard or traditional hot melt adhesives cannot be combined with polypropylene bags 100 because the temperatures needed to activate the adhesives are destructive to the PP material structure.

Embodiments of the adhesive layers 600, 602 comprise, an aqueous dispersion of an adhesive material or a water based adhesive materials applied in liquid form and air dried or cured to a stable, non-adhesive state when air dried to ambient temperature. Further embodiments of the adhesive layers 600, 602 each are an acrylic based waterborne adhesive or a polyurethane dispersion adhesive, or a butyl, synthetic or natural rubber adhesive. Other embodiments of the adhesive layers 600, 602 include a polyurethane adhesive dispersed in water (POD). A preferred embodiment is made up of 35 percent solids. It is applied at 1.75 grams/bag wet, assuming an 18" wide bag, across the 3" sealing area. The viscosity is adjusted to correspond with the mass flow rate of the preferred embodiments of an applicator apparatus and method, for example, a slot die applicator applying a stripe of the adhesive layers each of a viscosity of 800-1000 centipoises and a coating weight sufficient to form an adhesive-to-adhesive seal that will withstand bag tests to be described herein.

An embodiment of the adhesive layers 600, 602 for pinch sealing of PP woven bags 100 is comprised of synthetic polymer or co-polymer emulsions that are water- or solvent-based, including without limitation polyurethane dispersion adhesives, vinyls, acrylics, or other polymer or co-polymer emulsions, or may include natural or synthetic rubber-based adhesives, which are applied wet solubilized and then dried to a hardened state impervious to water and water vapor. Known application apparatus to use on a production line includes, but is not limited to spray applicators, wheels, or a slot die applicators. The adhesive layers 600, 602 form an adhesive-to-adhesive seal when activated to adhesive states by heat applied by a hot air jet or other thermal source at an elevated temperature up to about and less than about 300 degrees F. which is below the melting point temperature of the polymeric, polyolefin films and/or PP woven materials of the bag panels 106, 108 and the bag gussets 110 when present. Such adhesive layers 600, 602 provide adequate bond and adhesion to polyolefin films and/or PP woven materials, are FDA approved for non-direct food contact, and provide adequate sheer, peel and bond strengths to meet bag testing parameters to be described herein.

Two adhesive layers 600, 602 in particular are an acrylic based waterborne adhesive and a polyurethane dispersion adhesive. Each has an adhesive state activation temperature below 300° F., and below the softening point temperature $T_g$ of the polymeric layers 102, 104 made of compostable polypropylene, for example.

An embodiment of the adhesive layers 600, 602 includes: a polyurethane adhesive dispersion of 35% solids in water, with a viscosity adjusted for application to the bags, for example, a viscosity of approximately or about 800-1000 centipoises for application by a slot die applicator, or less than about 800 centipoises for application by a spray applicator. The viscosity is varied or adjusted to obtain an optimum mass flow rate and attain a desired coating weight as need for application by a specific form of applicator. Adhesive 1623-63A, is available commercially from Bostik, Inc. Wauwatosa, Wis. 53226, USA, wherein the adhesives per se form no part of the present invention separate from being a structural component of the bags disclosed herein. The embodiments of adhesive layers 660, 602 as a structural component of the bags includes 1.75 grams adhesive material per bag applied wet, solubilized in water, assuming an 18 inch wide bag and a 3 inches wide stripe of adhesive on the bag, which is equivalent to 0.6 grams per bag dry or about 10.6 lbs per ream dry weight coating. Once the adhesive layers 600, 602 are applied, they must pass under a drying system to evaporate the water and dry the adhesive layers to a stable state impervious to water, water vapor and ambient temperatures.

The bag 100 includes heat sealable material or materials on a low melt temperature, woven and solid polyolefin films. The suitable adhesive material or materials are applied to the bag surfaces as a solution or emulsion, and are air dried at temperatures below their heat activation temperatures to evaporate the volatiles of solvent or water and solidify. The solid adhesive materials are not moisture or pressure sensitive to activate to an adhesive state, and thereby avoid contamination of the bag contents during bag filling.

One suitable adhesive material for heat sealing polyolefin films of the bag 100 comprises a water based emulsion of triethylamine adhesive commercially available as AQUAGRIP® 19566F, manufactured by Bostik, Inc., 11320 Watertown Plank Road, Wauwatosa, Wis. 53226 USA. The water based emulsion comprises triethylamine Cas #121-44-8 Percent 0.5-1.5 which can be absorbed through the skin.

Before use consult the Material Safety Data Sheet (MSDS) for Material Name: L9566F prepared and distributed pursuant to the Federal Hazard Communication Standard: 29 C.F.R. 1910.1200. The MSDS discloses the following:

1. US ACGIH Threshold limit values: Time weighted average (TWA) mg/m$^3$ & ppm: TRIMETHYLAMINE 1 ppm.;
2. US OSHA Table Z-1-A (TWA): TRIMETHYLAMINE 40 mg/m$^3$ & 10 ppm.;
3. Typical Physical Properties: Target solids 35%; pH 8.5; Density 8.6 lb/gal; Odor: negligible; Color: Off White; Physical state Liquid; Volatile Organic Compounds (VOC) <0.2 lb/gal.;
4. Flashpoint>200° F. (>93.3° C.). Protect from freezing and direct sunlight and extremes of temperature;
5. HMIS Ratings: Health 1, Flammability 1, Physical Hazard 0, Personal Protection
6. SARA 311/312 Hazard Categories: Immediate Hazard Yes; Delayed Hazard No; Fire Hazard No; Pressure Hazard No; Reactivity Hazard No;
7. Hazardous polymerization does not occur;
8. Stable under normal conditions;
9. Hazardous combustion products may include carbon monoxide, carbon dioxide and hydrocarbon fragments;
10. Triethylamine Cas #121-44-8 can be absorbed through the skin;
11. WHIMS labeling: D2B—Other Toxic Effects—TOXIC.

Adhesive layers 600, 602 are applied on one or both bag panels 106, 108 across an area of width ranging from ½ inch to 6 inches across the entire or part of a bag panel 106, 108. The bag 100 is filled with contents through the open end 122 of the bag 100 where one or both panels 106, 108 have heat activated adhesive layers 600, 602 applied across the width of the open end 122 of the bag 100, wherein the first panel 106 and the second panel 108 are left unsealed to form an open bag end 122 through which bag contents are filled. Following a filling process, the panels forming an adhesive-to-adhesive seal, layer contact; the open bag end is then processed through a convention hot air or heat sealing apparatus, and the application of heat is at a temperature below the softening point temperature of the polymeric material to re-melt the first layer of adhesive material and the second layer of adhesive material preferably before making contact with each other, or alternatively, while in contact with each other.

After filling an embodiment of the bag 100 with contents on a manufacturing production line, the bag 100 is passed through a pinch sealing unit, not shown, that blows hot air onto the adhesive layers 600, 602 to activate the adhesive layers 600, 602 to adhesive states.

In the embodiment of FIGS. 1 and 1A, with the adhesive layers 600, 602 heat activated to adhesive states, the panels 106, 108 are held together or pinched preferably until the adhesive layers 600, 602 form an adherent adhesive-to-adhesive seal, and further preferably until the adhesive layers 600, 602 harden and stabilize dimensionally and become impervious to water, water vapor and ambient temperatures.

Similarly, in the embodiment of FIGS. 2 and 2A, the longer flap portion 502 and the shorter first panel 106 are held together or pinched preferably until the adhesive layers 600, 602 form an adherent adhesive-to-adhesive seal.

Similarly, in the embodiment of FIGS. 3 and 3A, with the adhesive layers 600, 602 heat activated to adhesive states, the bag 100 is folded along the fold line 206, the bag is foldable to fold the portion 202 of the first panel 106 on itself, and wherein the flap portion 502 is foldable toward the first panel 106 to hold the bag 100 folded by contact between the adhesive layer 600 and the further adhesive layer 602. The longer flap portion 502 and the shorter first panel 106 are held together or pinched and the panels 106, 108 are held together or pinched preferably until the adhesive layers 600, 602 form an adherent adhesive-to-adhesive seal, and further preferably until the adhesive layers 600, 602 harden and stabilize dimensionally and become impervious to water, water vapor and ambient temperatures. Further, in FIG. 3 the adhesive layer 600, or alternately, the adhesive layer 602, is applied on the sections 118, 120 of the gusseted sides 110 to fold along the fold line 206 and form an adhesive-to-adhesive seal when the sections 118, 120 of the gusseted sides 110 are closed and held or pinched against the section 204 of the first panel 106 to close and prevent leakage along the gusseted sides 110.

An embodiment of structural components of a polymeric woven bag 100 includes a polymeric outer layer 104, an inner polymeric woven bag layer 102 laminated to or adhesively adhered to the outer layer 104, a first panel 106 and a second panel 108 and an open end 122 of the bag 100 to be pinched closed between the first panel 106 and the second panel 108 after filling the bag 100 with contents, a structural component of a portion of the first panel 106 having a heat activated first adhesive layer 600 on a portion of the first panel to form an adhesive-to adhesive seal by contact with a heat activated adhesive layer 660 on a structural component of a portion 108 or 502 of the second panel 108, wherein the first adhesive layer 600 and the second adhesive layer 602 have respective heat activation temperatures below the softening point temperature of the polymeric material, and wherein the first adhesive layer 660 and the second adhesive layer 602 are dried and are water impervious, and wherein after filling the bag 100 with contents through the end 122 the first adhesive layer 600 and the second adhesive layer 602 are activatable to adhesive states by an application of heat at a temperature below the softening point temperature of the polymeric materials of the bag 100 to form the adhesive-to-adhesive seal.

Another embodiment of the structural components include a foldable flap portion 502 having a portion of the second adhesive layer 602 thereon to form the adhesive-to-adhesive seal.

The structural components must pass the following tests without tearing the first panel 106 or the second panel 106 or an embodiment of the sealing flap 502, and without opening the adhesive-to-adhesive seal between the first adhesive layer 600 and the second adhesive layer 602.

Bag Closure Test Requirements

7 Point Drop Test

The bag is filled to its capacity with the product in which the bag is produced to hold.

In most cases, we test with 50 lbs. of dry pet (dog/cat) food.

From a height of 4 feet, the bag is dropped squarely first on the face or front panel of the bag, then the back panel. The drops are repeated for each side of the bag, followed by each corner of the sealed end being evaluated. The last drop is a square drop onto the sealed end being test.

The seal area is checked for signs of failure after each drop. There is reason for concern if the seal begins to open at any point during the drop test, but the seal is not considered failed until product spills out.

Creep Test

The bag being tested is filled with 20 lbs. of sand.

The bag is suspended, or hung, inside an environmental chamber with the weight of the sand against the seal that is being evaluated for resisting creep (inelastic deformation).

The seal must pass under two conditions in the chamber:

Zero degrees F. for 72 hrs.

140 degrees F. @ 70% relative humidity for 72 hrs. (and/or other test conditions can be added as required for suitability of bag use in the pet food market, human food market and other product markets.)

Peel and Sheer Data

T-peel and sheer testing of sealed end are conducted on tensile tester.

Both peel and sheer tests are done over a temperature range of −20 degrees F. to +140 degrees F. (and/or other test conditions can be added as required for suitability of bag use in the pet food market, human food market and other product markets.)

This data is collected and reviewed to see what the effective working temperature range of the adhesive is.

Grease Resistance

A variety of high fat content dry pet foods will be used to fill bags and the seal will be evaluated under simulation of distribution (i.e. vibration and compression).

This will show whether or not the aggressive oils and seasonings in the food will attack the adhesive causing a seal failure.).

The seal must pass under two conditions in the test chamber:
1. 20 lbs. of pet food with a minimum of 20% fat content hung or suspend in an environmental chamber with the weight of the product against the sealed end being evaluated;

2, Suspension for at minimum, 72 hours at 140° F. at 70% relative humidity or other period adequate to test shelf-life and requirements suitable for the pet food market.

Development of a pinch bottom closure on woven polymeric (polypropylene) bags discovered that the polypropylene materials that the bag is constructed of could not withstand the heat required to re-activate a hot melt via typical hot air sealers. Theoretically, hot melts could be used but would need much longer sealing equipment in order to 1) run at much lower air temperatures, and 2) allow the bag more time to seal under the reduced heat.

To seal a multi-wall paper bag, its flap portion or sealing flap is coated with a 1.5 inch width of hot melt adhesive. After filling the bag with contents, the adhesive is heated to an adhesive state and the sealing flap is folded to adhere the adhesive against an adjacent 1.5 inch width of the bag. A typical hot air sealer equipment (apparatus) heats the hot melt adhesive to its melt temperature, while the paper materials of the bag withstand the hot melt temperature without heat damage. A pinch closure of the sealer equipment folds the sealing flap and pinches the bag to seal the sealing flap against the bag while the adhesive cures and dries. However, a typical hot air sealer equipment produces hot melt temperatures that would cause heat damage to woven polymeric (polypropylene) bags disclosed herein.

An embodiment of the invention provides a woven polymeric (polypropylene) bag 100 with a pinch closure without requiring new capital equipment for sealing the bags. The adhesives 600, 602 disclosed herein for sealing woven polymeric (polypropylene) bags 100 will reactivate to an adhesive state at much lower temperatures than higher melt temperatures required to melt a hot melt adhesive, and will do so within the current dwell times provided by today's typical hot air sealer equipment. A problem was that the lower melt temperature adhesives disclosed herein provide an adhesive-to-adhesive seal while the sealing flap 502 is folded against the panel section 204. The adhesive-to-adhesive seal requires adhesive coatings 600, 602 over a wide area across the polymeric bags 100. More specifically, a full 3 inch width of adhesive coatings 600, 602 is needed, which provides a problem for the typical hot air sealer equipment. The typical hot air sealer equipment is capable of heating a 1.5 inch width of hot melt adhesive on a sealing flap of a multi-wall paper bag. However, hot air distribution is needed over a 3 inch wide area across the woven polymeric bag 100. For this reason, the hot air sealer equipment is modified with an air manifold to distribute hot air to where it is needed over a 3 inch wide area across the woven polymeric bag 100. This modification provides a capability of the same hot air sealer equipment to seal both multi-wall paper bags and woven polymeric bags 100 on the same equipment.

Figure 4:
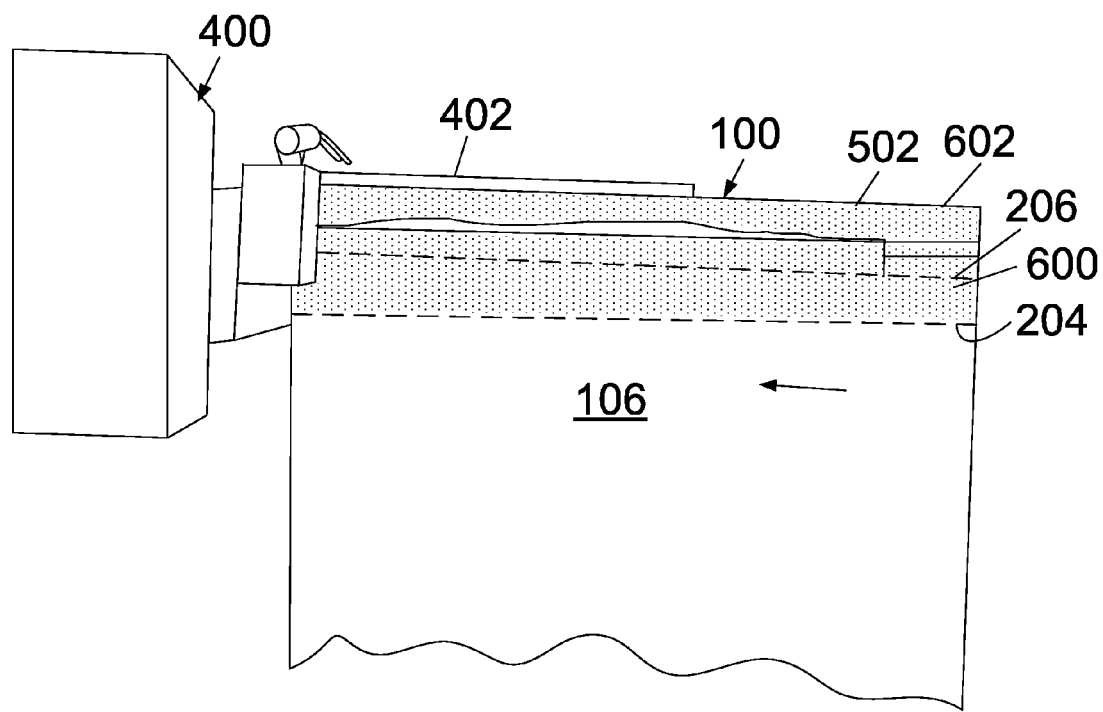
FIG. 4 is a schematic view of a portion of a hot air sealer apparatus and a woven polymeric bag conveyed from right to left as viewed in the Figure.

FIG. 4 discloses a portion of a pinch sealing unit 400 or hot air sealer apparatus 400 and a woven polymeric bag 100 conveyed from right to left as viewed in the Figure. The apparatus 400 has a stationary guide plate 402 against which the bag 100 is supported. The stationary guide plate 402 has a vertical orientation.

Figure 5:
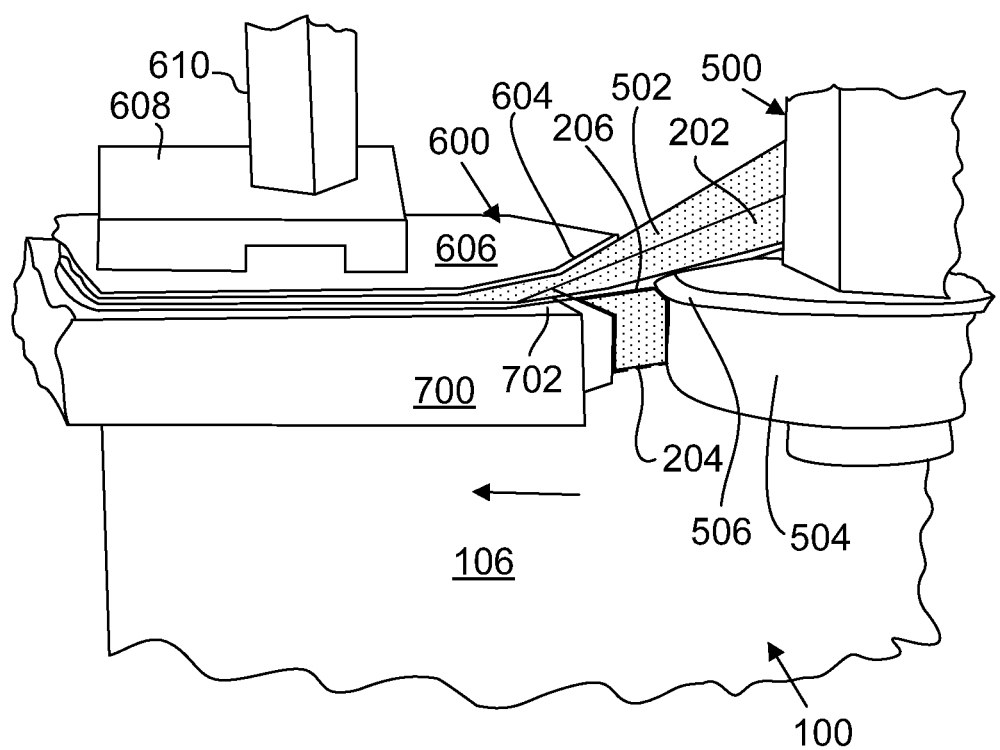
FIG. 5 is a schematic view of a creasing apparatus of the hot air sealer apparatus of FIG. 4. Further, FIG. 5 discloses a folding section of the hot air sealer apparatus of FIG. 4.

FIG. 5 discloses a creasing apparatus 500 of the hot air sealer apparatus 400. The bag 100 is conveyed past a rotatable creasing wheel 504. A circumference of the creasing wheel 504 rolls over the bag 100 to pinch close the bag end 122 while the bag end 122 is conveyed between the creasing wheel 504 and the guide plate 402. The creasing wheel 504 has a projecting circumferential rim flange 506 to press against the fold line 206, disclosed by FIG. 3, of the bag 100, and to crease the bag 100 along its fold line 206. The creased bag 100 folds along the fold line 206, which pivots the flap portion 502 and the section 202 of the panel 106 along the fold line 206.

Figure 6:
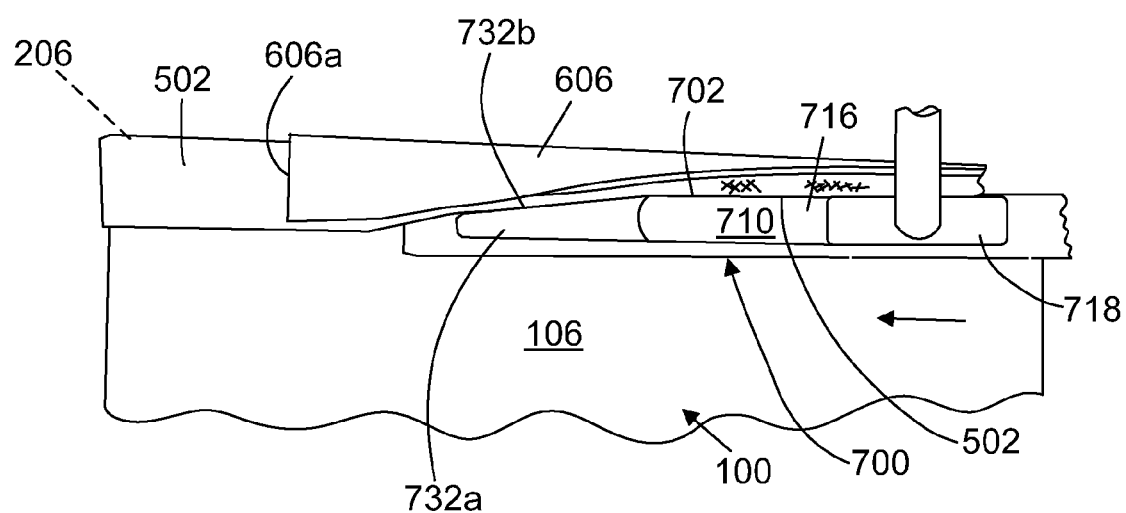
FIG. 6 is a schematic view of the hot air manifold of FIG. 7 in the folding section of FIG. 5.

In FIG. 5, after passing the creasing wheel, the flap portion 502 and the section 202 of the panel 106 enters a folding apparatus 600 of the hot air sealer apparatus 400. For the bag 100 in FIG. 2, the flap portion 502 first passes under a diagonal flared leading edge 604 of a folding blade 606. For the bag 100 in FIG. 3, the flap portion 502 and the section 202 of the panel 106 first passes under a diagonal flared leading edge 604 of a folding blade 606. The folding blade 606 is formed lengthwise along a bent stationary blade, such that the bent stationary blade extends behind the flap portion 502 and the section 202 of the panel 106. The flared leading edge 604 guides the flap portion 502 and the section 202 of the panel 106 under the folding blade 606. With reference to FIG. 6, the flap portion 502 and the section 202 of the panel 106 continues to pass under and against the folding blade 606. The folding blade 606 extends lengthwise rearward of its flared leading edge 604 and bends downward progressively of its length until it is parallel to a top wall 702, disclosed by FIG. 6, of a hot air manifold 700.

An adhesive layer 602, disclosed by FIGS. 2 and 3, coats the flap portion 502 and the section 202 of the panel 106. The adhesive layer 602 is heated to an adhesive state by hot air blown through a top wall 702 of a hot air manifold 700, disclosed by FIG. 7. Further, the bag 100 has an adhesive layer 600, disclosed by FIGS. 2 and 3. The adhesive layer 600 is heated by hot air blown through a back wall 704 of the hot air chamber 716. For example, the adhesive layer 602 on the flap portion 502 and the section 202 of the panel 106 of the bag 100 is approximately 1.5 inches in width and extends across the bag 100. Similarly, the adhesive layer 602 is approximately 1.5 inches in width and extends across the bag 100.

Figure 7:
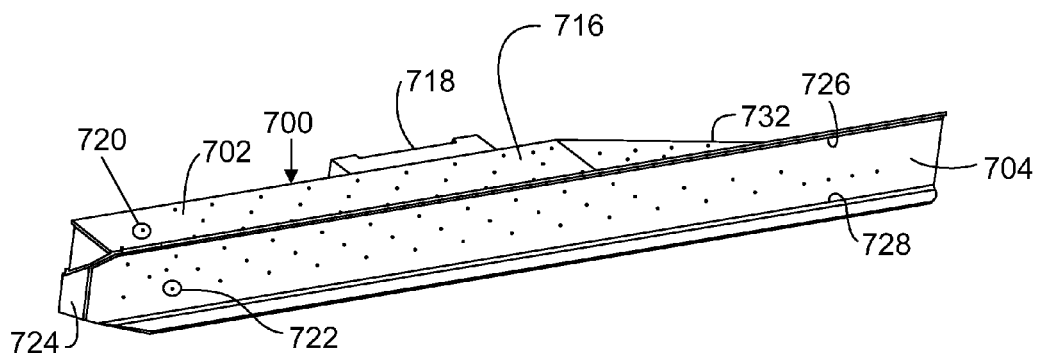
FIG. 7 is an isometric view of a hot air manifold to be incorporated in the folding section of FIG. 5.
Figure 8:
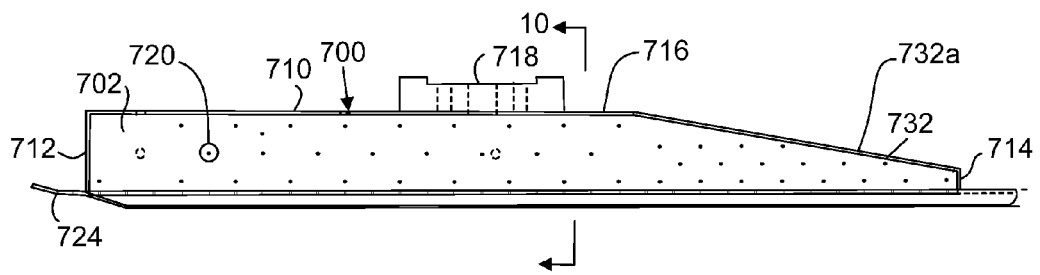
FIG. 8 is a top plan view of the a hot air manifold of FIG. 7.
Figure 9:
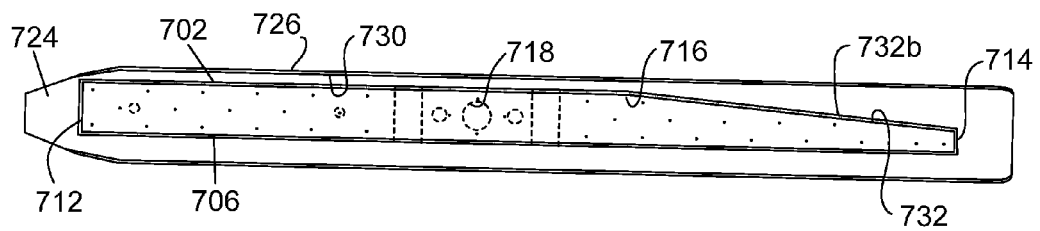
FIG. 9 is a view of a back wall of the a hot air manifold of FIG. 7.
Figure 10:
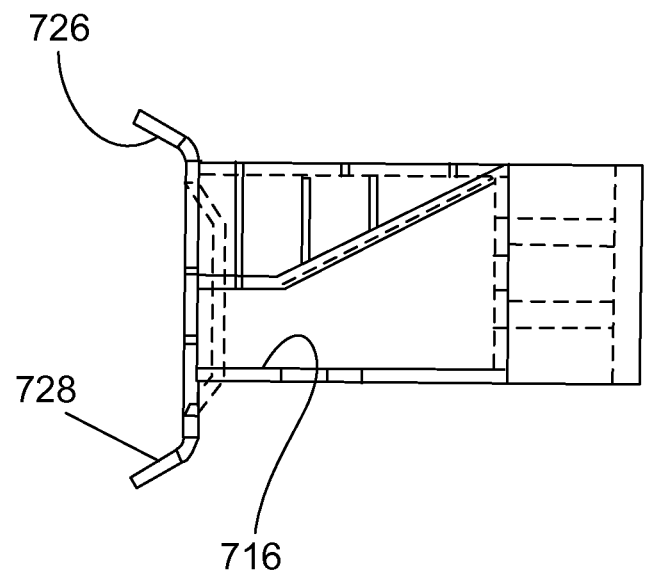
FIG. 10 is a cross section along the line 10-10 of FIG. 8.

FIG. 7 discloses the hot air manifold 700 of the hot air sealer apparatus 400 having a hollow hot air chamber 716, disclosed by FIGS. 8, 9 and 10. The hot air chamber 716 is provided by the top wall 702, the back wall 704, a bottom wall 706 in FIG. 9, a front wall 710 in FIG. 8 and end walls 712, 714, for example, made by stamping and forming individual pieces and welding or brazing the pieces together to form the hot air chamber 716. An inlet 718 to the hot air chamber 716 is provided through the front wall 710. Hot air under pressure is supplied through the inlet 718 to pressurize the hollow chamber 716.

FIGS. 7 and 8 disclose the top wall 702 is perforated with a distribution of air passages 720 blowing hot air onto the adhesive layer 602 on the flap portion 502 and on the adhesive layer 600 on the section 202 of the panel 106. The back wall 704 is perforated with a distribution of air passages 722 blowing hot air onto the adhesive layer 600 on the panel section 204 of the bag 100. The back wall 704 has a flared leading edge 724 to guide the panel section 204 past the leading edge 724. FIG. 9 discloses the top wall 702 is recessed below the top edge margin 726 to define a recess 730 along the top wall 702 to space the adhesive layers 600, 602 away from the top wall 702 and prevent contact therebetween while the adhesive layer 602 on the flap portion 502 and the adhesive layer 600 on the bag section 202 is heated to an adhesive state by the hot air blown under pressure from the hot air chamber 716 through the air passages 720 through the top wall 702.

Figure 11:
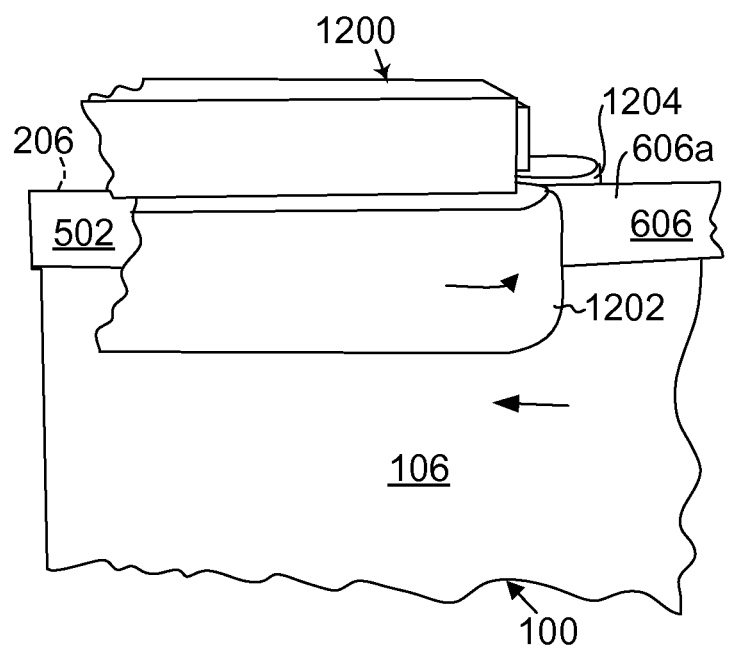
FIG. 11 is a schematic view of a pinch closing and cooling apparatus of the hot air sealer apparatus of FIG. 4.

FIG. 6 discloses the hot air manifold 700 in the hot air sealer apparatus 400. Further, FIG. 6 discloses a tapered trailing end 732 of the hot air chamber 716. The hot air chamber 716 tapers inward at 732a along the front wall 710, disclosed by FIGS. 8 and 11, toward the trailing end 732. The hot air chamber 716 tapers downward at 732b, disclosed by FIGS. 9 and 11, along the top wall 702 toward the trailing end 732. In FIG. 11, hot air is supplied to the hot air chamber 116 by way of a hot air conduit 720 connected to the inlet 718.

In FIG. 6, the bag 100 having the flap portion 502 and the panel section 202 is conveyed from right to left over the top wall 702 of the hot air chamber 716, while hot air under pressure is blown from the hot air chamber 16 through the passages 720 through the top wall 702 and onto the adhesive layer 602 on the flap portion 502 and onto the adhesive layer 600 on the panel section 202. The adhesive layers 600, 602 are heated to adhesive states by the hot air, and thereafter pass a trailing end 732 of the hot air chamber 716.

According to an embodiment of the invention, the passages 722 are added to the back wall 704 such that hot air under pressure is blown from the hot air chamber 116 through the passages 722 through the back wall 704 and onto the adhesive layer 600 disclosed by FIGS. 2 and 3, on the panel section 204 disclosed by FIG. 3. The adhesive layer 600 is heated to an adhesive state by the hot air, and thereafter passes a trailing end 732 of the hot air chamber 716. Further, the back wall 704, disclosed by FIG. 10, has lengthwise outwardly projecting edge margins 726, 728 formed by bending. The projecting edge margins 726, 728 form a lengthwise cavity 730 disclosed by FIG. 10, wherein the projecting edge margins 726, 728 space the adhesive layer 600 on the panel section 204 away from the back wall 704 to prevent contact therebetween while the adhesive layer 600 is heated to an adhesive state by the hot air.

The hot air sealer apparatus 400 is adapted for pinch closing and sealing a multi-wall paper bag, not shown, having a hot melt adhesive. The hot air manifold 700 is further capable of heating the hot melt adhesive to a hot melt temperature by adjusting the temperature at which the hot air is heated in the hot air chamber 716. The multi-wall paper bag can withstand the hot melt temperature. However, the bag 100 of polymeric material cannot withstand the hot melt temperature. Accordingly, the temperature at which the hot air is heated in the hot air chamber 116 must be adjusted below the melt temperatures or softening point temperatures of polymeric materials used in making the bag 100. Further, a multi-wall paper bag, not shown, which has a hot melt adhesive layer of about 1.5 inches in width across the bag can be heated by hot air blown through the top wall 702. However, the multi-wall paper bag does not have additional adhesive to form an adhesive-to-adhesive seal. For this reason, hot air blown through the back wall 704 of the hot air chamber 716 impinges harmlessly against the multi-wall paper bag, wherein the paper material of the multi-wall paper bag withstands the hot melt temperature of the hot air.

FIG. 6 discloses the folding blade 606 biases against the bag 100 to hold the flap portion 502 and the section 202 of the panel 106 downward toward the top wall 702 as the flap portion 502 and the section 202 of the panel 106 are conveyed from right to left. Further, the folding blade 606 has a trailing end 606a that extends beyond the trailing end 732 of the hot air chamber 716. The folding blade 606 progressively bends lengthwise toward its trailing end 606a until its trailing end 606a is essentially vertical beyond the trailing end 732 of the hot air chamber 716. The progressively bending folding blade 606 biases the flap portion 502 and the section 202 of the panel 106 progressively downward to follow the tapered top wall 732b of the hot air chamber 716. Beyond the trailing end 732 of the hot air chamber 716, the trailing end 606a of folding blade 606 biases the flap portion 502 and the section 202 of the panel 106 essentially vertical. Further, the trailing end 606a of the folding blade 606 biases the flap portion 502 to fold, as disclosed in FIGS. 2 and 3, along the fold line 206, FIG. 3, while the adhesive layer 600 on the panel section 202 has been heated to an adhesive state and becomes biased to engage against the heated adhesive layer 600, disclosed by FIGS. 2 and 3, on the panel section 204 of the bag 100, which has been heated to an adhesive state. The folded panel section 202 and folded flap portion 502 emerge from the trailing end 606a of the folding blade 606 while the bag 100 continues to be conveyed from right to left.

FIG. 11 discloses a pinch closing apparatus 1200 of the hot air sealer apparatus 400. A pair of roller driven belt drives 1202, 1204 pinch on opposite sides of the folded bag 100 to pinch close the bag 100, and further, to clamp the second panel 108 of the bag 100 against the first panel 106 of the bag and form an adhesive-to adhesive seal by contact between the first adhesive layer 600 and the second adhesive layer 602. The belt drives 1202, 1202 apply clamping pressure transferred to the adhesive layers 600 while they become cooled to ambient and form solidified, sealed states, to form an adhesive-to-adhesive seal.

In FIG. 11, the roller driven belt drives 1202, 1204 can overlap the trailing end 606a of the folding blade 606 to draw the folded bag 100 out from the folding blade 606. The roller driven belt drives 1202, 1204 apply continuous clamping pressure on the bag 100 as they convey the bag 100 away from the trailing end 606a of the folding blade 606. After leaving the belt drives 1202, 1204, the bag 100 can be clamped to continue with clamping pressure applied on the opposite sides of the folded bag 100, along the folded section 202, to apply clamping pressure against the adhesive layers 600, 602 to adhere them to each other while they become cooled to ambient and form solidified, sealed states.

This description of the exemplary embodiments is intended to be read in connection with the accompanying drawings, which are to be considered part of the entire written description. In the description, relative terms such as "lower," "upper," "horizontal," "vertical,", "above," "below," "up," "down," "top" and "bottom" as well as derivative thereof (e.g., "horizontally," "downwardly," "upwardly," etc.) should be construed to refer to the orientation as then described or as shown in the drawing under discussion. These relative terms are for convenience of description and do not require that the apparatus be constructed or operated in a particular orientation. Terms concerning attachments, coupling and the like, such as "connected" and "interconnected," refer to a relationship wherein structures are secured or attached to one another either directly or indirectly through intervening structures, as well as both movable or rigid attachments or relationships, unless expressly described otherwise.

Patents and patent applications referred to herein are hereby incorporated by reference in their entireties. Although the invention has been described in terms of exemplary embodiments, it is not limited thereto. Rather, the appended claims should be construed broadly, to include other variants and embodiments of the invention, which may be made by those skilled in the art without departing from the scope and range of equivalents of the invention.

What is claimed is:

1. A method of pinch closing and sealing a bag made of polymeric material, comprising:

applying a heat activated first adhesive layer on a first panel of the bag;

applying a heat activated second adhesive layer on a second panel of the bag including a flap portion, wherein the first adhesive layer and the second adhesive layer have respective heat activation temperatures below the softening point temperature of the polymeric material;

pinch closing an open end of the bag;

creasing the bag along a fold line;

conveying the bag along a hot air manifold, wherein the hot air manifold has a hot air chamber;

heating the second adhesive layer to an adhesive state by hot air under pressure from the hot air chamber and blown through first air passages through a top wall of the hot air chamber, wherein the second adhesive layer is heated to a temperature below the softening point temperature of the polymeric material to activate the second adhesive layer to an adhesive state;

heating the first adhesive layer to an adhesive state by hot air under pressure from the hot air chamber and blown through second air passages through a back wall of the hot air chamber, wherein the first adhesive layer is heated to a temperature below the softening point temperature of the polymeric material to activate the first adhesive layer to an adhesive state; and folding the bag along the fold line to form an adhesive-to adhesive seal by contact between the first adhesive layer and the second adhesive layer.

2. A method using a system for closing and sealing an end of bag taken from multiple bags each made of polymeric material and sealed at one end, wherein the bag has adhesive material on a first section of a first panel, and has adhesive material on a stepped construction of the bag comprising a second section of the first panel, portions of side gussets and a portion of a second panel, comprising:

conveying the bag along a hot air manifold of the system after the bag has been filled with contents and closed, then creased to provide a fold line, wherein the hot air manifold has a hot air chamber;

heating the adhesive material on the first section of the first panel to its adhesive state by hot air blown through air passages through a back wall of the hot air chamber, and heating the adhesive material on the stepped construction of the bag to its adhesive state by hot air blown through air passages through a top wall of the hot air chamber, wherein the adhesive material is heated to a temperature below the softening point temperature of the polymeric material, at which temperature the adhesive material is activated to its adhesive state while the bag is being conveyed; and folding the bag along the fold line, and to be followed by applying pressure to contact the adhesive material on the stepped construction of the bag with the adhesive material on the first section of the first panel, to form an adhesive-to adhesive seal, which seals the end of the bag through which end the bag has been filled with contents.

3. The method of claim 2, comprising:

heating the adhesive material to its adhesive state while having a dimension up to 3.81 cm (1.5 inches) in width on the first section of the first panel, and heating the adhesive material to its adhesive state while having a dimension up to 3.81 cm (1.5 inches) in width on the stepped construction of the bag.

4. The method of claim 2, comprising:

conveying the bag continuously along the hot air manifold, while heating the adhesive material to its adhesive state.

5. The method of claim 2, comprising:

biasing the stepped construction of the bag toward the top wall of the hot air chamber while heating the adhesive material on the stepped construction of the bag to its adhesive state.

6. The method of claim 2, comprising:

spacing the adhesive material from the top wall of the hot air chamber to prevent contact therebetween while heating the adhesive material to its adhesive state.

7. The method of claim 2, comprising:

spacing the adhesive material from the back wall of the hot air chamber to prevent contact therebetween while heating the adhesive material to its adhesive state.

8. The method of claim 2, comprising:

folding the bag along the fold line, wherein the adhesive material on the stepped construction of the panel forms an adhesive-to-adhesive seal with the adhesive material on the first section of the first panel below the fold line.

9. The method of claim 2, comprising:

folding the bag along the fold line, wherein the adhesive material on the second panel is spaced from the fold line and forms an adhesive-to-adhesive seal with the adhesive material on the first section of the first panel below the fold line.

* * * * *